(12) United States Patent
Okamoto

(10) Patent No.: US 6,335,844 B1
(45) Date of Patent: Jan. 1, 2002

(54) MAGNETIC RECORDING APPARATUS WITH A MAGNETIC HEAD FOR WRITING DATA TO A MAGNETIC DISC

(75) Inventor: Yujiro Okamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/362,687

(22) Filed: Jul. 29, 1999

(30) Foreign Application Priority Data

Jul. 31, 1998 (JP) ............................................. 10-217009

(51) Int. Cl.⁷ ............................... G11B 5/09; G11B 5/02
(52) U.S. Cl. ............................................. 360/68; 360/46
(58) Field of Search ............................... 360/46, 67, 68

(56) References Cited

U.S. PATENT DOCUMENTS 4,868,691 A * 9/1989 Kawasaki ..................... 360/68

* cited by examiner

*Primary Examiner*—Regina Y. Neal
(74) *Attorney, Agent, or Firm*—Arent Fox Kintner Plotkin & Kahn, PLLC

(57) ABSTRACT

A magnetic recording apparatus has a magnetic head for writing data to a magnetic disk, a writing circuit for feeding a current to the magnetic head, a controller for controlling the operation of the writing circuit, and a temporary shutoff circuit for shutting off the current temporarily while the operation of the controller is in a transient period. The writing circuit has a first transistor, which is connected to the magnetic head. The temporary shutoff circuit has a second transistor so as to temporarily deactivate and thereafter activate the first transistor when electric power starts being supplied by pulling into the second transistor the transient current resulting from variation in the base voltage of the second transistor as a result of the parasitic capacitor present at the base of the second transistor being charged when electric power starts being supplied.

6 Claims, 5 Drawing Sheets

US 6,335,844 B1

MAGNETIC RECORDING APPARATUS WITH A MAGNETIC HEAD FOR WRITING DATA TO A MAGNETIC DISC

BACKGROUND OF THE INVENTION

1. Field of the Invention

The present invention relates to a magnetic recording apparatus such as a floppy disk drive or hard disk drive.

2. Description of the Prior Art

A conventional magnetic recording apparatus will be described. FIG. 4 is a circuit diagram of the writing circuit of a conventional magnetic recording apparatus. The writing circuit amplifies a write signal, by which data is written to a magnetic disk (not shown) such as a floppy disk or hard disk, so as to feed a write current $I_7$ or $I_8$ to a magnetic head 2. In FIG. 4, the two ends of the magnetic head 2 are connected to output terminals 24 and 25 of the writing circuit. The magnetic head 2 has a center tap, which is connected to a supplied voltage Vcc. The write signal is fed in via two input terminals 40 and 41.

The input terminal 40 is connected to the base of an npn-type transistor Q11. The input terminal 41 is connected to the base of an npn-type transistor Q8. The collector of the transistor Q8 is connected to the supplied voltage Vcc. Between the base of the transistor Q8 and the supplied voltage Vcc, a constant current source circuit 42 is connected. The constant current source circuit 42 outputs a current $I_{11}$ that flows from the supplied voltage Vcc to the base of the transistor Q8. Between the emitter of the transistor Q8 and ground, a resistor R6 is connected. Between the base of the transistor Q8 and ground, a resistor R5 is connected.

The collector of the transistor Q11 is connected to the supplied voltage Vcc. Between the base of the transistor Q11 and the supplied voltage Vcc, a constant current source circuit 43 is connected. The constant current source circuit 43 outputs a current $I_{12}$ that flows from the supplied voltage Vcc to the base of the transistor Q11. Between the base of the transistor Q11 and ground, a resistor R9 is connected. Between the emitter of the transistor Q11 and ground, a resistor R8 is connected.

The emitter of the transistor Q8 is connected to the base of an npn-type transistor Q9. The emitter of the transistor Q11 is connected to the base of an npn-type transistor Q10. The emitters of the transistors Q9 and Q10 are connected together, and, between this node and ground, a constant current source circuit 23 is connected. The constant current source circuit 23 outputs a constant current $I_6$. The collector of the transistor Q9 is connected to the output terminal 24. The collector of the transistor Q10 is connected to the output terminal 25.

FIG. 5 is a circuit diagram showing the internal configuration of the constant current source circuit 42. The emitter of a pnp-type transistor Q30 is connected through a resistor R20 to the supplied voltage Vcc. The collector of the transistor Q30 is connected to a current source 50. The current source 50 outputs a current $I_{20}$. The base of the transistor Q30 is connected to the collector of the transistor Q30 and to the base of a pnp-type transistor Q31. Between the bases of the transistors Q30 and Q31 and ground, a parasitic capacitance 51 is present. The emitter of the transistor Q31 is connected through a resistor R21 to the supplied voltage Vcc. From the collector of the transistor Q31, the current $I_{11}$ is fed out.

This writing circuit is controlled by a controller 7 so as to be either in an active mode in which its data writing operation is permitted or in an inactive mode in which its data writing operation is inhibited. The controller 7 outputs a signal, which is fed to the gates of n-channel MOS transistors Q13 and Q14. The sources of the MOS transistors Q13 and Q14 are each connected to ground. The drain of the MOS transistor Q13 is connected to the input terminal 41, and the drain of the MOS transistor Q14 is connected to the input terminal 40.

In the inactive mode, the controller 7 feeds a high-level signal to the writing circuit. This causes the MOS transistors Q13 and Q14 to be turned on. As a result, the ground voltage is fed to the bases of the transistors Q8 and Q11, which are thus turned off. As a result, the ground voltage is fed to the bases of the transistors Q9 and Q10, which are thus turned off. Consequently, the writing circuit does not operate as a whole, and thus does not feed the write current 17 nor $I_8$ to the magnetic head 2.

By contrast, in the active mode, the controller 7 feeds a low-level signal to the writing circuit. This causes the MOS transistors Q13 and Q14 to be turned off. Consequently, the writing circuit can feed the write current $I_7$ or $I_8$ to the magnetic head 2 in synchronism with the signals fed in via the input terminals 40 and 41.

However, in the circuit shown in FIG. 4, immediately after the supplied voltage Vcc starts being supplied in the magnetic recording apparatus, there is a possibility of a write current being unnecessarily fed to the magnetic head 2 before the entire apparatus becomes ready for writing operation. When electric power starts being supplied, the current source 50 is off, and thus does not output the current $I_{20}$; however, a current Ic that momentarily flows into the parasitic capacitance 51 induces the base currents of the pnp-type transistors Q30 and Q31, which are thus turned on momentarily, causing the current $I_{11}$ to flow momentarily. At this moment, if the controller 7 has not yet been started up completely, it cannot feed a high-level signal to the n-channel MOS transistor Q13, and thus cannot make the MOS transistor Q13 absorb the momentary current $I_{11}$ mentioned just above. This causes a momentary rise in the base voltage of the transistor Q8, which is thus turned on, causing an unnecessary write current to flow via the output terminal 24. This is the reason that there is a possibility of the write current $I_7$ or $I_8$ being unnecessarily fed to the magnetic head 2. Permitting such a flow of the write current $I_7$ or $I_8$ results in noise being written to the magnetic disk (not shown). Accordingly, in a magnetic recording apparatus, it is desirable in the first place that the flow of a write current such as $I_7$ or $I_8$ be inhibited in a transient period such as when electric power has just started being supplied.

SUMMARY OF THE INVENTION

An object of the present invention is to provide a magnetic recording apparatus in which, when electric power has just started being supplied, generation of a write current is inhibited to prevent noise.

To achieve the above object, according to the present invention, a magnetic recording apparatus is provided with: a magnetic head for writing data to a magnetic disk; a writing circuit for feeding a write current to the magnetic head; and a temporary shutoff circuit for temporarily deactivating and thereafter activating the writing circuit when electric power starts being supplied.

According to this circuit configuration, when electric power starts being supplied, the temporary shutoff circuit suppresses, for example, the bias voltage output from the writing circuit. Thus, it is possible to prevent writing operation from being unnecessarily performed as a result of a transient current flowing through the magnetic head despite absence of data to be written. In this way, it is possible to prevent noise from being written to the magnetic disk before the bias voltage becomes stable after electric power starts being supplied.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
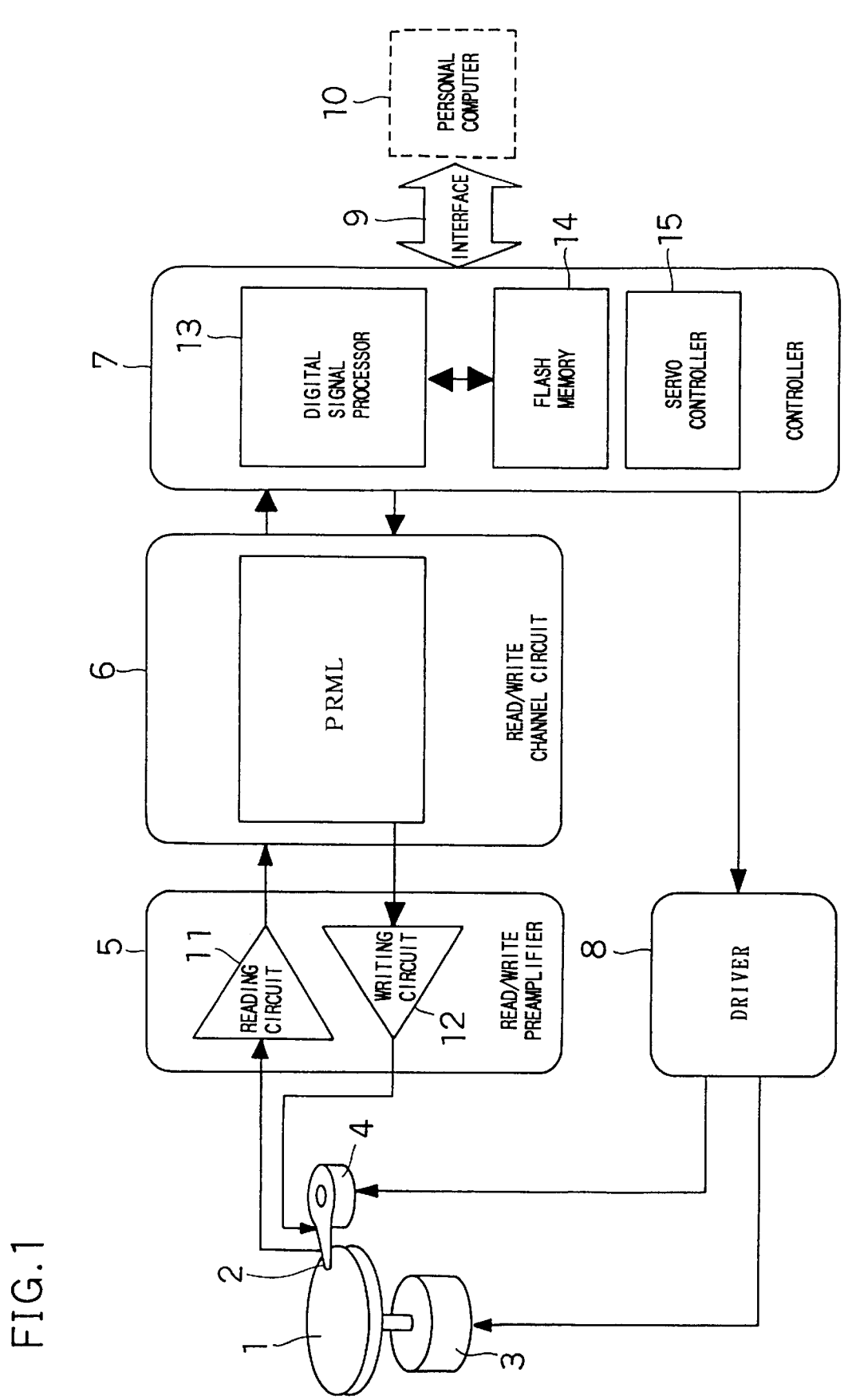
FIG. 1 is a block diagram of the magnetic recording apparatus of a first embodiment of the invention.

Hereinafter, a first embodiment of the present invention will be described. FIG. 1 is a block diagram of the magnetic recording apparatus of a first embodiment of the invention. A magnetic disk 1 is, for example, a floppy disk. A magnetic head 2 reads the data recorded on the magnetic disk 1, and writes data to the magnetic disk 1.

A spindle motor 3 is a motor for rotating the magnetic disk 1. A voice control motor 4 is a motor for adjusting the tracking of the magnetic head 2. A read/write preamplifier 5 is connected to the magnetic head 2, and is composed of a reading circuit 11 for amplifying the signal reproduced by the magnetic head 2 and a writing circuit 12 for amplifying a write signal that is going to be fed to the magnetic head 2 to cause data to be written to the magnetic disk 1. The read/write preamplifier 5 is provided with a bias circuit 26 (see FIG. 2) for feeding a bias current to the writing circuit 12.

A read/write channel circuit 6 performs processing such as error correction on the reproduced signal fed from the read/write preamplifier 5, and feeds a write signal to the read/write preamplifier 5. In addition, the read/write channel circuit 6 performs PRML (partial response maximum likelihood) signal processing.

A controller 7 is composed of a digital signal processor 13, a flash memory 14, and a servo controller 15. The digital signal processor 13 controls reading and writing operation of the magnetic recording apparatus. The flash memory 14, which may be omitted in some magnetic recording apparatuses, is provided to allow storage of defective addresses of the magnetic disk 1 under the control of the digital signal processor 13 so as to prevent access to those addresses by the magnetic recording apparatus.

The servo controller 15, by feeding a control signal to a driver 8, controls the driver 8 automatically in accordance with the settings made in advance by the digital signal processor 13. The driver 8 has a driver for driving the spindle motor 3 and a driver for driving the voice control motor 4. The controller 7 is connected through an interface 9 to a personal computer 10.

Figure 2:
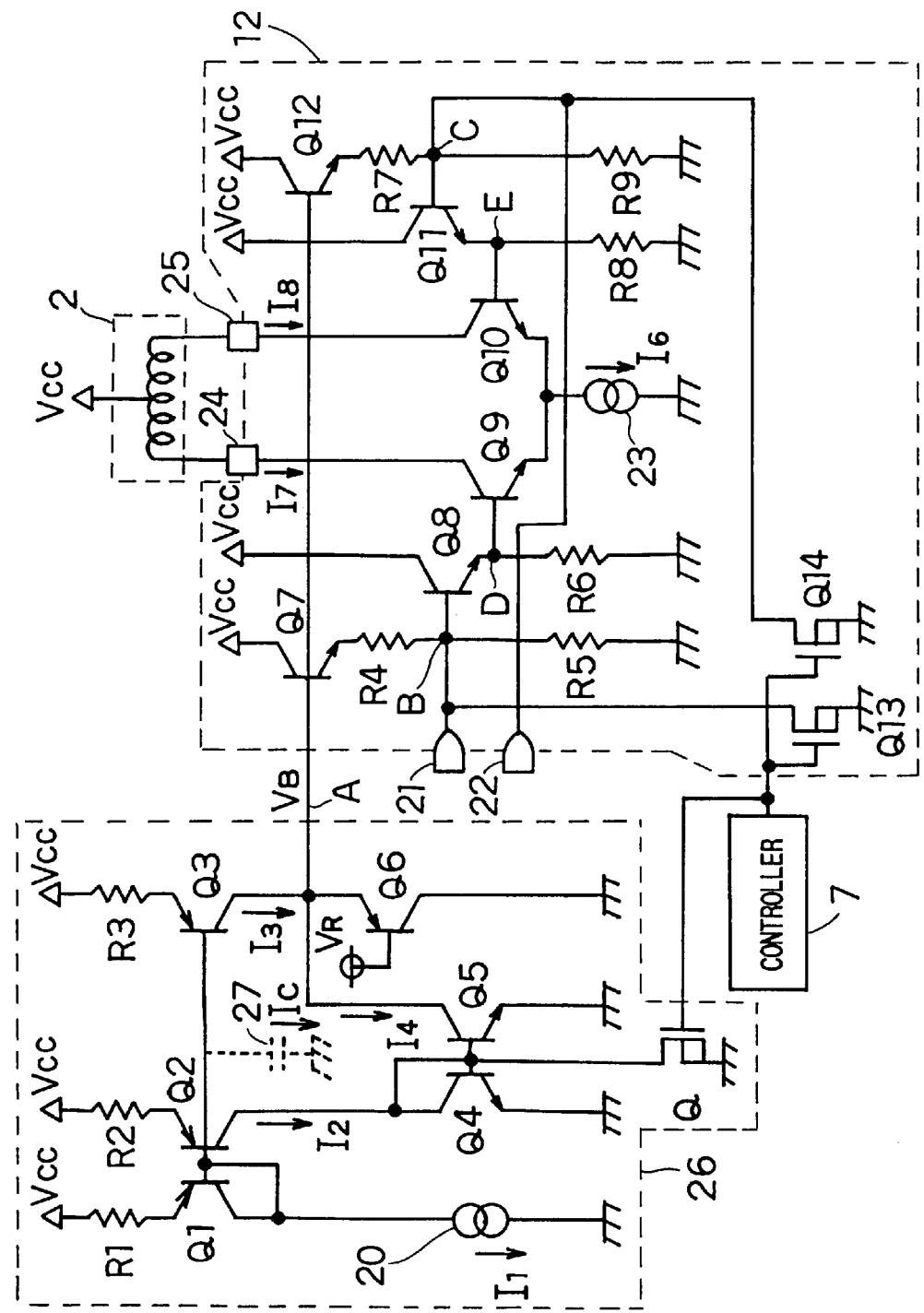
FIG. 2 is a circuit diagram of the bias circuit and the writing circuit of the magnetic recording apparatus of the first embodiment.

Next, with reference to FIG. 2, the internal configuration of the writing circuit 12 and the bias circuit 26 provided within the read/write preamplifier 5 will be described. The writing circuit 12 amplifies a signal that is fed in via input terminals 21 and 22, and feeds a current $I_7$ or $I_8$ to the magnetic head 2, which is connected to output terminals 24 and 25, to write data to the magnetic disk 1 (see FIG. 1). The magnetic head 2 has a center tap, which is connected to a supplied voltage Vcc. To the input terminals 21 and 22, a write signal is fed from the read/write channel circuit 6.

The bias voltage $V_B$ from the bias circuit 26 is fed to the bases of the npn-type transistors Q7 and Q12 provided in the writing circuit 12. The collectors of the transistors Q7 and Q12 are both connected to the supplied voltage Vcc. Between the emitter of the transistor Q7 and ground, a circuit having resistors R4 and R5 connected in series is connected. The node B between the resistors R4 and R5 is connected to the input terminal 21 and to the base of an npn-type transistor Q8. Between the emitter of the transistor Q12 and ground, a circuit having resistors R7 and R9 connected in series is connected. The node C between the resistors R7 and R9 is connected to the input terminal 22 and to the base of an npn-type transistor Q11.

The collector of the transistor Q8 is connected to the supplied voltage Vcc. Between the emitter of the transistor Q8 and ground, a resistor R6 is connected. The node D between the emitter of the transistor Q8 and the resistor R6 is connected to the base of an npn-type transistor Q9. The collector of the transistor Q11 is connected to the supplied voltage Vcc. Between the emitter of the transistor Q11 and ground, a resistor R8 is connected. The node E between the emitter of the transistor Q11 and the resistor R8 is connected to the base of an npn type transistor Q10.

The collector of the transistor Q9 is connected to the output terminal 24. The collector of the transistor Q10 is connected to the output terminal 25. The emitters of the transistors Q9 and Q10 are connected together, and, between this node and ground, a constant current source circuit 23 is connected. The constant current source circuit 23 outputs a constant current $I_6$.

A signal fed from the controller 7 is, within the writing circuit 12, fed to the gates of two n-channel MOS transistors Q13 and Q14. The drain of the MOS transistor Q13 is connected to the input terminal 21. The source of the MOS transistor Q13 is connected to ground. The drain of the MOS transistor Q14 is connected to the input terminal 22. The source of the MOS transistor Q14 is connected to ground. The transistors Q9 and Q10 and the constant current source circuit 23 together constitute a differential amplifier circuit, which amplifies, on a differential basis, the signal fed to the bases of the transistors Q9 and Q10. As a result, the writing circuit 12 feeds the current $I_7$ or $I_8$ to the magnetic head 2 connected to the output terminals 24 and 25.

The resistors R4, R5, and R6 and the transistor Q8 together constitute a buffer circuit. This buffer circuit, when activated by the bias voltage $V_B$, amplifies the write signal fed in via the input terminal 21 and then feeds it to the base of the transistor Q9, which constitutes a part of the differential amplifier circuit. Similarly, the resistors R7, R8, and R9 and the transistor Q11 together constitute a buffer circuit. This buffer circuit, when activated by the bias voltage $V_B$, amplifies the write signal fed in via the input terminal 22 and then feeds it to the base of the transistor Q10, which constitutes a part of the differential amplifier circuit.

The controller 7 controls the operation mode of the writing circuit 12. To bring the writing circuit 12 into an active mode, the controller 7 outputs a low-level signal. As a result, the MOS transistors Q13 and Q14 are turned off, and thus the transistors Q8 and Q11 are activated. Consequently, the writing circuit 12 amplifies the write signal fed in via the input terminals 21 and 22 to write data to the magnetic disk (see FIG. 1).

By contrast, to bring the writing circuit 12 into an inactive mode, the controller 7 outputs a high-level signal. As a result, the MOS transistors Q13 and Q14 are turned on, and thus the transistors Q8 and Q11 are turned off. Consequently, with the transistors Q9 and Q10 kept inactive, the writing circuit 12 does not output a write current to the magnetic head 2. In this way, the controller 7 outputs a high-level signal to turn off the transistors Q8 to Q11 and thereby bring the writing circuit 12 into the inactive mode.

In the bias circuit 26, between the emitter of a pnp-type transistor Q1 and the supplied voltage Vcc, a resistor R1 is connected. Between the collector of the transistor Q1 and ground, a current source circuit 20 is connected. The base and collector of the transistor Q1 are connected together. Between the emitter of a pnp-type transistor Q2 and the supplied voltage Vcc, a resistor R2 is connected. The collector of the transistor Q2 is connected to the collector and base of an npn type transistor Q4. The emitter of the transistor Q4 is connected to ground. The base of the transistor Q4 is connected to the base of an npn-type transistor Q5 and to the drain of an n-channel MOS transistor Q. The source of the MOS transistor Q is connected to the ground, and its gate is connected to the controller 7. The transistors Q4, Q5, and Q together constitute a temporary shutoff circuit.

The bases of the transistors Q1 and Q2 and the base of a pnp-type transistor Q3 are connected together. Between this node and ground, a parasitic capacitance 27 is present due to junction capacitance, wiring capacitance, and the like. Between the emitter of the transistor Q3 and the supplied voltage Vcc, a resistor R3 is connected. The collector of the transistor Q3 is connected to the collector of the npn-type transistor Q5. The emitter of the transistor Q5 is connected to ground. The collector of the transistor Q3 is connected to the emitter of a pnp-type transistor Q6. The base of the transistor Q6 is connected to a reference voltage $V_R$. The collector of the transistor Q6 is connected to ground. From the emitter A of the transistor Q6, the bias voltage $V_B$ is fed out.

When electric power starts being supplied, a current source 20 is off. However, the charging current Ic that momentarily flows into the parasitic capacitance 27 present at the bases of the transistors Q1, Q2, and Q3, which constitute a first current mirror circuit, induces the base currents of these transistors, and thus the transistors Q1, Q2, and Q3 are activated momentarily, causing a current $I_3$ to flow momentarily. However, at this moment, a current $I_2$ also flows, and thus the pnp-type transistors Q4 and Q5, which constitute a second current mirror circuit, are also activated. As a result, the collector of the transistor Q5 completely absorbs the current $I_3$, and thereby keeps the voltage $V_B$ stably at a low voltage (nearly equal to the ground voltage). Consequently, even if the current $I_3$ flows, the transistor Q7 is not activated, nor is the transistor Q12 activated. Accordingly, irrespective of whether the controller 7 has been started up completely or not, no unnecessary write current flows via the output terminals 24 and 25. Thus, no noise is written to the magnetic disk 1.

In a while, the current Ic that flows into the parasitic capacitance 27 increases the base voltages of the transistor Q1 to Q3, and thereby decreases the current $I_3$, decreasing similarly the current $I_2$ and also the current $I_4$. This makes the transistor Q5 less conducting, and thus increases the collector-emitter impedance thereof. As a result, the voltage $V_B$ at the point A gradually rises. When this voltage becomes higher than the reference voltage $V_R$ fed to the base of the transistor Q6 by a voltage $V_{BE}$ (the base-emitter conducting voltage of the transistor Q6), the transistor Q6 is turned on, and thus the bias voltage $V_B$ is kept stably at a voltage $V_R$ + $V_{BE}$. Thereafter, when the controller 7 turns its output to a high level, the terminals 21 and 22 are fixed at a low level, bringing the writing circuit 12 into the inactive mode, and simultaneously the MOS transistor Q stops the operation of the temporary shutoff circuit.

In the magnetic recording apparatus of this embodiment, in a transient period as when electric power has just started being supplied, even if the bias circuit 26 starts operating earlier than the controller 7, the bias voltage $V_B$ is kept at a low voltage (ground voltage), and thus the transistors Q7 and Q12 are never turned on transiently. In this way, the bias circuit 26 is configured as a shutoff circuit that shuts off the currents $I_7$ and $I_8$ while the operation of the controller 7 is in a transient period, and accordingly no noise is ever written to the magnetic disk 1 in such a transient period.

Thereafter, when data is written to the magnetic disk 1, the controller 7 outputs a low-level signal to bring the writing circuit 12 into the active mode in which its writing operation is permitted. Then, in accordance with the signal fed from the read/write channel circuit 6, the writing circuit 12 feeds the write current $I_7$ or $I_8$ to the magnetic head 2 to write data to the magnetic disk 1.

Second Embodiment

Figure 3:
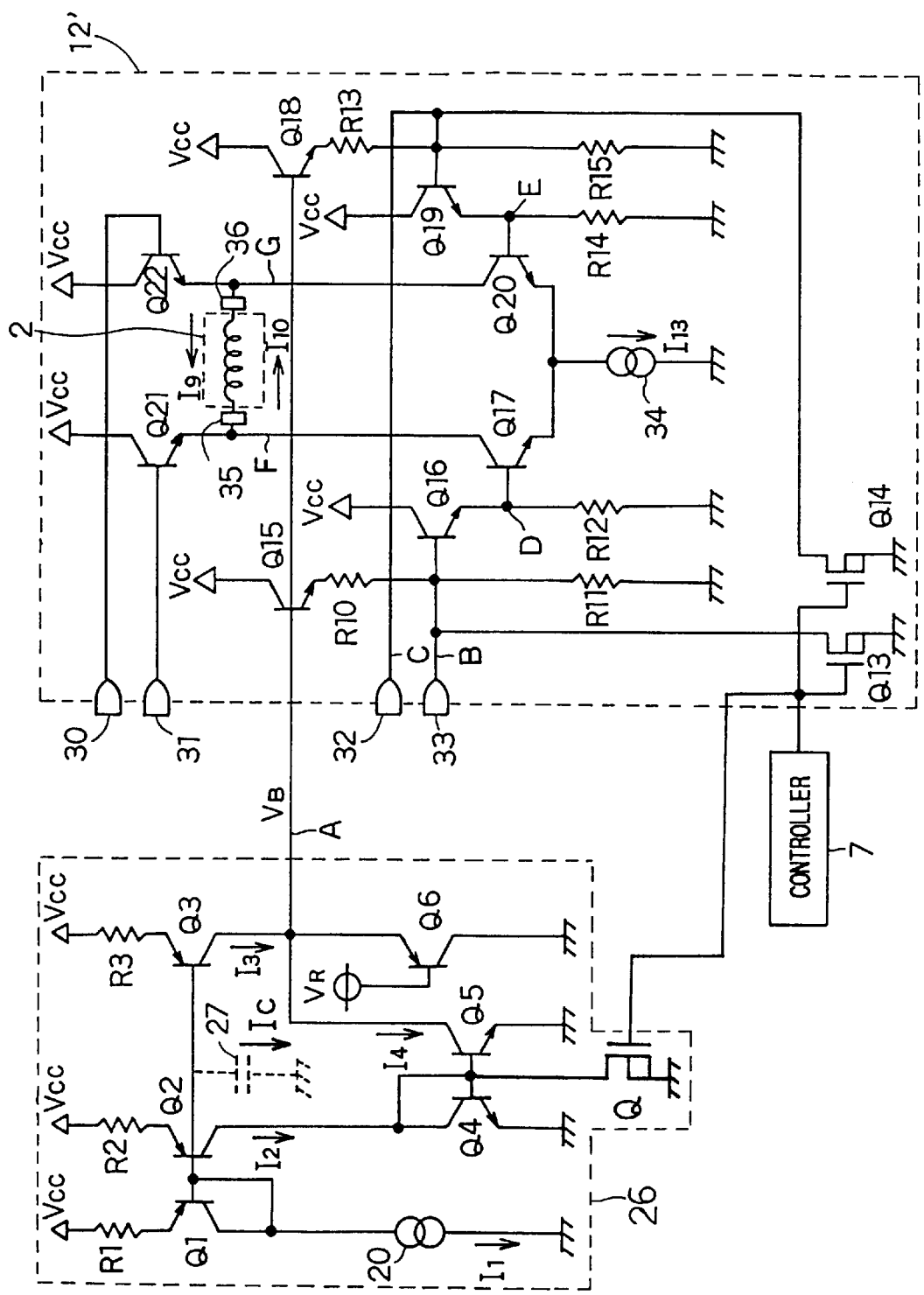
FIG. 3 is a circuit diagram of the bias circuit and the writing circuit of the magnetic recording apparatus of a second embodiment of the invention.
Figure 4:
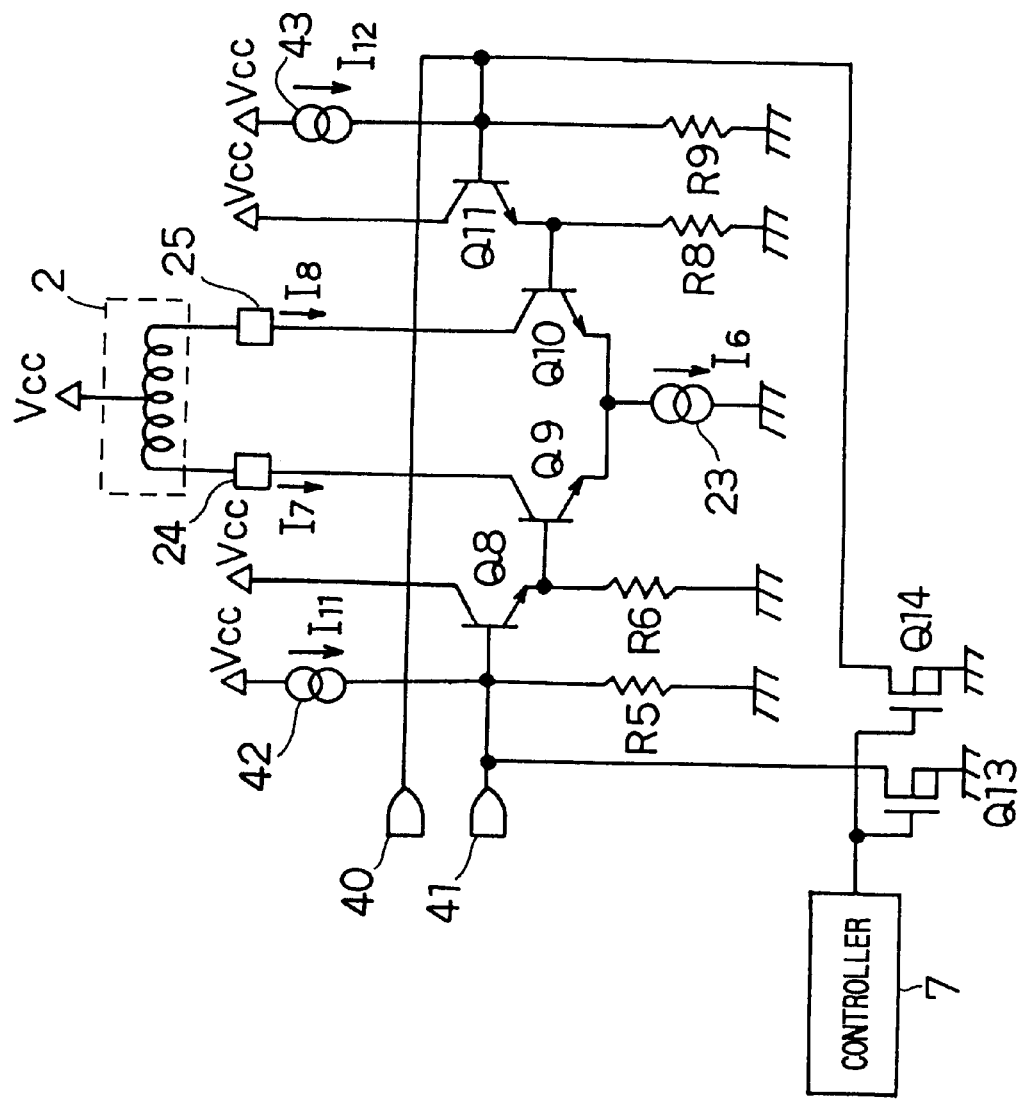
FIG. 4 is a circuit diagram of the writing circuit of a conventional magnetic recording apparatus.
Figure 5:
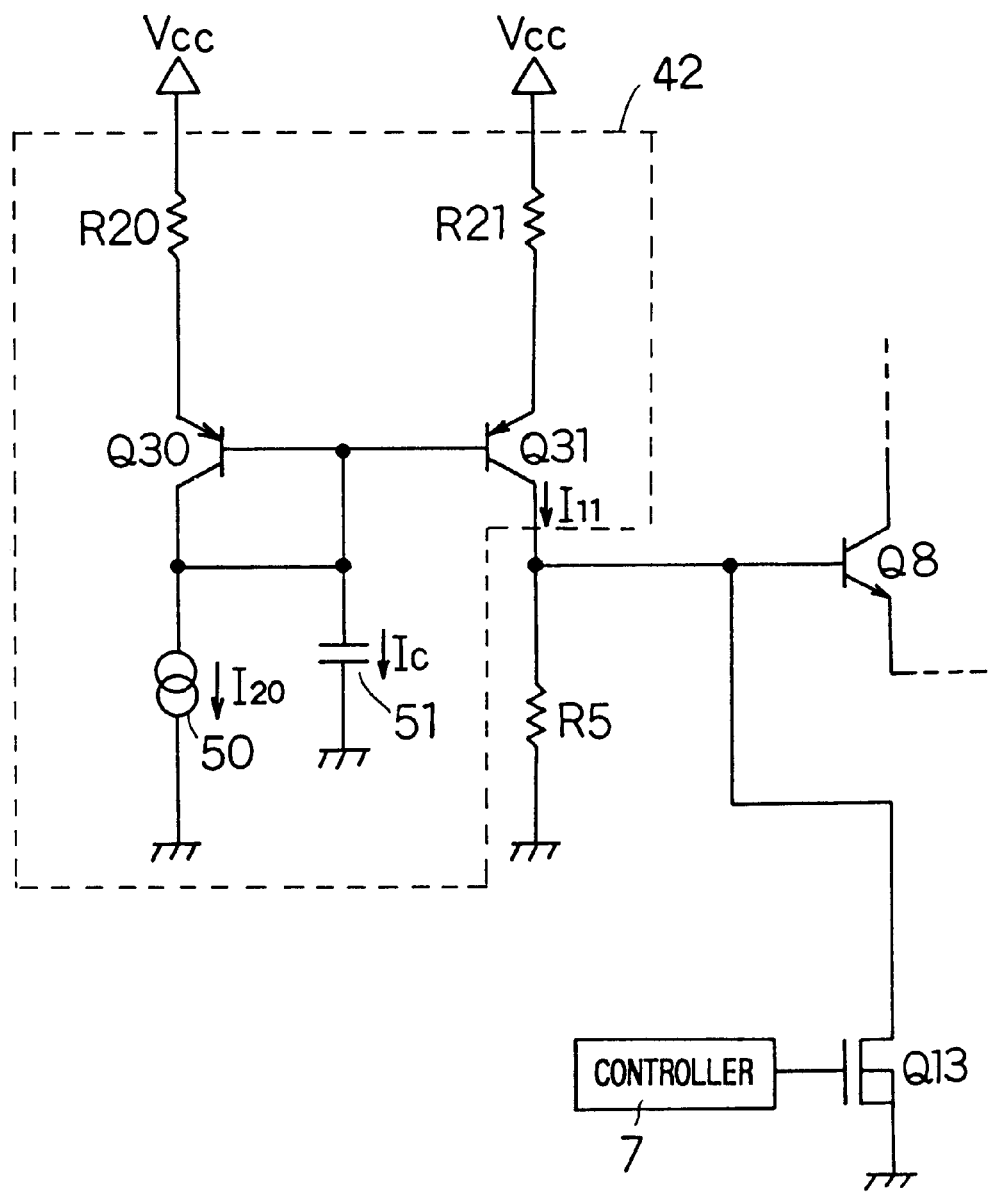
FIG. 5 is a circuit diagram of the current source circuit employed in the conventional magnetic recording apparatus shown in FIG. 4.

Next, a second embodiment of the present invention will be described. FIG. 3 is a circuit diagram showing the internal configuration of the writing circuit 12' of the magnetic recording apparatus of a second embodiment of the invention. In this embodiment, the magnetic recording apparatus as a whole has almost the same configuration as shown in the block diagram of FIG. 1. Here, in place of the input terminals 21 and 22 shown in FIG. 2, input terminals 30 to 33 are provided. The input terminals 30 and 31 are connected to the bases of npn-type transistors Q22 and Q21. The emitters of the transistors Q21 and Q22 are connected to output terminals 35 and 36 and to the collectors of transistors Q17 and Q20, respectively. The collectors of the transistors Q21 and Q22 are connected to a supplied voltage Vcc. In this embodiment, the magnetic disk 1 is a hard disk.

Moreover, in the second embodiment, the input terminals 32 and 33 correspond to the input terminals 22 and 21, respectively, of the first embodiment; the transistors Q15 to Q17 correspond to the transistors Q7 to Q9, respectively, of the first embodiment; the transistors Q18 to Q20 correspond to the transistors Q12 to Q10, respectively, of the first embodiment; the resistors R10 to R15 correspond to the resistors R4 to R9, respectively, of the first embodiment. Moreover, the bias circuit 26 has the same configuration as the bias circuit 26 of the first embodiment.

In the inactive mode, the controller 7 outputs a high-level signal. This causes MOS transistors Q13 and Q14 to be turned on. As a result, the voltages at the bases of the transistors Q16 and Q19 turn to a low voltage, and thus the transistors Q16 and Q19 are turned off. As a result, the voltages at the bases of the transistors Q17 and Q20 turn to a low voltage, and thus the transistors Q17 and Q20 are turned off. Now that the transistors Q17 and Q20 are off, no current flows through the magnetic head 2. In this way, when the controller 7 outputs a high-level signal, the writing circuit 12' is brought into an inactive mode, and thus feeds no current to the magnetic head 2.

By contrast, in the active mode, the controller 7 outputs a low-level signal. This causes the MOS transistors Q13 and Q14 to be turned off. As a result, the writing circuit 12' feeds a write current $I_9$ or $I_{10}$ to the magnetic head 2 in accordance with the signals fed in via the input terminals 30 to 33. The write signals fed in via the input terminals 30 and 32, and the write signals fed in via the input terminals 31 and 33, are switched in an interlocked and synchronized manner, so that the transistors Q21 and Q17 are not turned on simultaneously, nor are the transistors Q22 and Q20 turned on simultaneously.

In the magnetic recording apparatus of this embodiment, in a transient period as when electric power has just started being supplied, even if the bias circuit 26 starts operating earlier than the controller 7, the bias circuit 26 keeps the bias voltage $V_B$ at a low voltage until the operation of the controller 7 becomes stable. At this time, the transistors Q15 and Q18 are turned off, and thus the 15 voltage at the point B, which is connected to the base of the transistor Q16, turns to a low voltage. Similarly, the voltage at the point C, which is connected to the base of the transistor Q19, also turns to a low voltage. As a result, the transistors Q16 and Q19 are turned off, causing the voltages at both the points D and E at the emitters of the transistors Q16 and Q19 to turn to a low level. As a result, the transistors Q17 and Q20 are turned off. Thus, the write current $I_9$ or $I_{10}$ does not flow through the magnetic head 2.

In this way, when electric power starts being supplied, even if the supplied voltage Vcc starts being fed to the bias circuit 26 before the controller 7 starts operating, no current flows into the magnetic head 2, and thus no noise is written to the magnetic disk 1. Thereafter, when the controller 7 starts operating stably, it outputs a low-level signal to bring the writing circuit 12' into the active mode in which its writing operation is permitted. Then, the writing circuit 12' feeds a current to the magnetic head 2 in accordance with the write signals fed from the read/write channel circuit 6.

What is claimed is:

1. A magnetic recording apparatus comprising:
   a magnetic head for writing data to a magnetic disk;
   a writing circuit for feeding a write current to the magnetic head; and
   a temporary shutoff circuit for temporarily deactivating the writing circuit until a parasitic capacitor present in the writing circuit is charged and thereafter activating the writing circuit when electric power starts being supplied,
   wherein the writing circuit has a first transistor for writing, the first transistor having an input terminal fed with data to be written and having an output terminal connected to the magnetic head, and the temporary shutoff circuit has a second transistor and a third transistor connected to a collector of the second transistor, the temporary shutoff circuit temporarily deactivating the first transistor when electric power starts being supplied by pulling into the third transistor a transient current resulting from variation in a base voltage of the second transistor as a result of a parasitic capacitance present at a base of the second transistor being charged when electric power starts being supplied.

2. A magnetic recording apparatus as claimed in claim 1, further comprising:
   a mode setting transistor connected to an input of the first transistor; and
   a controller for controlling the mode setting transistor such that the writing circuit is either in an active mode or in an inactive mode by controlling an on/off state of the mode setting transistor.

3. A magnetic recording apparatus as claimed in claim 1, wherein the first transistor is a differential pair of transistors that constitute a differential amplifier, and the magnetic head is connected between output terminals of the differential pair of transistors.

4. A magnetic recording apparatus as claimed in claim 3, wherein the output terminals of the differential pair of transistors are collectors, to which emitters of another differential pair of transistors are connected individually, and data to be written is applied to bases of these two differential pairs of transistors so that a current flows through the magnetic head in one direction or in a direction opposite thereto in accordance with the data to be written.

5. A magnetic recording apparatus comprising:
   a magnetic head for writing data to a magnetic disk;
   a writing circuit for feeding a write current to the magnetic head; and
   a temporary shutoff circuit for temporarily deactivating and thereafter activating the writing circuit when electric power starts being supplied,
   wherein the writing circuit has a writing transistor having an input terminal fed with data to be written and having an output terminal connected to the magnetic head,
   wherein the temporary shutoff circuit comprises:
   a first current mirror circuit composed of pnp-type transistors fed with a current from a current source;
   a second current mirror circuit composed of npn-type transistors fed with a first output of the first current mirror circuit;
   a pnp-type transistor having an emitter connected to a node between a second output of the first current mirror circuit and an output of the second current mirror circuit, having a base connected to a constant voltage, and having a collector connected to a reference-voltage point; and
   means for controlling a bias of the writing transistor in accordance with a voltage at the node, and
   wherein the writing transistor is temporarily deactivated during a period in which the voltage at the node turns from a low level to a predetermined high level as a parasitic capacitance present at bases of the transistors constituting the first current mirror circuit is charged when electric power starts being supplied.

6. A magnetic recording apparatus comprising:
   a magnetic head for writing data to a magnetic disk;
   a writing circuit for feeding a write current to the magnetic head,
   wherein the writing circuit has a writing transistor having an input terminal fed with data to be written and having an output terminal connected to the magnetic head;
   a temporary shutoff circuit for temporarily deactivating and thereafter activating the writing circuit when electric power starts being supplied;

a mode setting transistor connected to an input of the writing transistor; and a controller for controlling the mode setting transistor such that the writing circuit is either in an active mode or in an inactive mode by controlling an on/off state of the mode setting transistor, wherein the temporary shutoff circuit comprises:

a first current mirror circuit composed of pnp-type transistors fed with a current from a current source;

a second current mirror circuit composed of npn-type transistors fed with a first output of the first current mirror circuit;

a pnp-type transistor having an emitter connected to a node between a second output of the first current mirror circuit and an output of the second current mirror circuit, having a base connected to a constant voltage, and having a collector connected to a reference-voltage point; and means for controlling a bias of the writing transistor in accordance with a voltage at the node, and wherein the writing transistor is temporarily deactivated during a period in which the voltage at the node turns from a low level to a predetermined high level as a parasitic capacitance present at bases of the transistors constituting the first current mirror circuit is charged when electric power starts being supplied.

* * * * *